US011967270B2

(12) United States Patent
Kong

(10) Patent No.: US 11,967,270 B2
(45) Date of Patent: Apr. 23, 2024

(54) LED DISPLAY SYSTEM AND CONTROL METHOD THEREOF

(71) Applicant: HANGZHOU SHIXIN TECHNOLOGY CO., LTD, Zhejiang (CN)

(72) Inventor: Lingjun Kong, Zhejiang (CN)

(73) Assignee: HANGZHOU SHIXIN TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 18/007,767

(22) PCT Filed: Apr. 26, 2021

(86) PCT No.: PCT/CN2021/089987

§ 371 (c)(1),
(2) Date: Dec. 2, 2022

(87) PCT Pub. No.: WO2021/258845

PCT Pub. Date: Dec. 30, 2021

(65) Prior Publication Data

US 2023/0230531 A1 Jul. 20, 2023

(30) Foreign Application Priority Data

Jun. 24, 2020 (CN) ......................... 202010587425.2

(51) Int. Cl.
*G09G 3/32* (2016.01)
*G09G 3/20* (2006.01)

(52) U.S. Cl.
CPC ............ *G09G 3/32* (2013.01); *G09G 3/2096* (2013.01); *G09G 2310/0264* (2013.01); *G09G 2370/00* (2013.01)

(58) Field of Classification Search
CPC ............ G09G 3/3688; G09G 2370/08; G09G 2310/0275
See application file for complete search history.

(56) References Cited

U.S. PATENT DOCUMENTS 6,603,466 B1 8/2003 Sakaguchi et al.
7,180,512 B2 2/2007 Kumagai et al.
(Continued)

FOREIGN PATENT DOCUMENTS

CN 1435806 A 8/2003
CN 1460983 A 12/2003
(Continued)

OTHER PUBLICATIONS

International Search Report (including English translation) and Written Opinion for International Application No. PCT/CN2021/089987, dated Jul. 19, 2021, 10 pages.

*Primary Examiner* — Van N Chow
(74) *Attorney, Agent, or Firm* — Westman, Champlin & Koehler, P.A.

(57) ABSTRACT

Disclosed is a LED display system and a control method thereof. The display system comprises a control card outputting clock signals and data signals; at least one driving circuit group, coupled with the control card, and each including a plurality of cascaded driving circuits, receiving a clock signal and a data signal and transmitting them among the plurality of driving circuits, wherein at least one stage of driving circuit in each driving circuit group comprises an inverter, which inverts the clock signal received by the current stage of driving circuit to obtain an inverted clock signal. The LED display system of the present disclosure can effectively avoid excessive attenuation of the clock signal in the cascaded driving circuits, ensure data sampling correctness based on the clock signal, and ensure display effect of the LED display screen.

19 Claims, 3 Drawing Sheets

(56) References Cited

U.S. PATENT DOCUMENTS

| | | | | |
|---|---|---|---|---|
| 7,215,312 | B2 | 5/2007 | Kumagai et al. | |
| 2003/0142053 | A1 | 7/2003 | Kumagai et al. | |
| 2003/0218588 | A1 | 11/2003 | Kumagai et al. | |
| 2008/0036723 | A1 | 2/2008 | Fujioka et al. | |
| 2010/0182226 | A1* | 7/2010 | Umezaki ................ | G11C 19/28 345/98 |
| 2010/0245304 | A1* | 9/2010 | Umezaki .............. | G09G 3/3648 345/205 |
| 2010/0245335 | A1* | 9/2010 | Kimura ................ | G09G 3/3688 345/213 |
| 2022/0139304 | A1* | 5/2022 | Ting ......................... | G09G 3/32 345/55 |

FOREIGN PATENT DOCUMENTS

| | | | |
|---|---|---|---|
| CN | 111833803 | A | 10/2020 |
| CN | 213025337 | U | 4/2021 |

* cited by examiner

LED DISPLAY SYSTEM AND CONTROL METHOD THEREOF

CROSS-REFERENCE TO RELATED APPLICATION

The present application is a Section 371 National Stage Application of International Application No. PCT/CN2021/089987, filed on Apr. 26, 2021, which published as WO 2021/258845 A1, on Dec. 30, 2021, not in English, and claims priority to a Chinese patent application No. 202010587425.2, filed on Jun. 24, 2020, entitled "LED display system and control method thereof", the disclosures of which are incorporated herein by reference in their entireties.

FIELD OF THE DISCLOSURE

The present disclosure relates to a technical field of display technology, in particular, to a LED display system of a LED display screen and a control method thereof.

DESCRIPTION OF THE RELATED ART

A conventional LED (Light Emitting Diode) display system is shown in FIG. 1 and the LED display system 100 generally includes a control card 110 and a plurality of driving circuits 120. The control card 110 provides a plurality of signals, each of which controls a corresponding one of the plurality of driving circuits 120 that are serially connected in sequence. With the increasing of the number of the plurality of driving circuits 120 that are serially connected in the system, the signals provided by the control card 110 will gradually be attenuated due to an increasing load, wherein clock signal attenuation during transmission can be especially obvious.

A clock signal is a signal that is switched back and forth between high voltage level and low voltage level. When the clock signal suffers from attenuation, a duty cycle of the clock signal will change. If the clock signal serving for data sampling is attenuated all along, other digital signals will not be read correctly, which will affect display effect of the LED display screen.

SUMMARY OF THE DISCLOSURE

In view of the above problems, an objective of the present disclosure is to provide a LED display system and a control method thereof, thereby preventing a clock signal from suffering excessive attenuation and ensuring display effect of a LED display screen.

According to one aspect of the present disclosure, the present disclosure provides a LED display system, which comprises: a control card, configured to output a plurality of clock signals and a plurality of data signals; at least one driving circuit group, which is coupled with the control card, wherein each of the at least one driving circuit group comprises a plurality of driving circuits which are connected in cascade, and is configured to receive a corresponding one of the plurality of clock signals and the corresponding one of the plurality of data signals, and transmit the corresponding one of the plurality of clock signals and the corresponding one of the plurality of data signals in the plurality of driving circuits, wherein in each of the at least one driving circuit group, at least one stage of the plurality of driving circuits each comprise an inverter which is configured to perform inverting processing on the corresponding one of the plurality of clock signals, which is received by that stage of the plurality of driving circuits, to obtain an inverted clock signal.

In some embodiments, each stage of the plurality of driving circuits further comprises: a communication unit, which is coupled with the control card or a previous stage of the plurality of driving circuits to receive the corresponding one of the plurality of clock signals and the corresponding one of the plurality of data signals, and is configured to decode the corresponding one of the plurality of data signals according to the corresponding one of the plurality of clock signals, and transmit the corresponding one of the plurality of data signals to a next stage of the plurality of driving circuits.

In some embodiments, each of the plurality of driving circuits comprised by each of the at least one driving circuit group comprises the inverter.

In some embodiments, the data signal corresponding to each of the at least one driving circuit group comprises: display data, a parameter and identity numbers of the plurality of driving circuits comprised by that driving circuit group.

In some embodiments, each stage of the plurality of driving circuits further comprises: a comparison and selection unit, coupled with the communication unit to receive the corresponding one of the plurality of data signals which is decoded, and configured to selectively provide the inverted clock signal or the corresponding one of the plurality of clock signals, which is received by that stage of the plurality of driving circuits, to a next stage of the plurality of driving circuits, according to the parameter and a corresponding one of the identity numbers of the plurality of driving circuits, wherein the parameter is a positive integer.

In some embodiments, in each stage of the plurality of driving circuits, the comparison and selection unit comprises: a comparator, coupled to the communication unit to receive the parameter and the identity number corresponding to that stage of the plurality of driving circuits, and configured to provide a comparison result obtained by comparing the parameter and the identity number corresponding to that stage of the plurality of driving circuits; a selector, having a first input terminal coupled with the inverter to receive the inverted clock signal, a second input terminal receiving the clock signal of that stage of the plurality of driving circuits, a control terminal coupled with an output terminal of the comparator to receive the comparison result, and an output terminal for outputting the inverted clock signal or the clock signal of that stage of the plurality of driving circuits to a next stage of the plurality of driving circuits.

In some embodiments, the identity numbers, respectively corresponding to the plurality of driving circuits in each of the at least one driving circuit group, are sequentially configured to be 1, 2, 3, . . . , X or sequentially and cyclically configured to be 1 to N, where X is a positive integer and N represents the parameter value.

In some embodiments, in each stage of the plurality of driving circuits, when the comparison result obtained by the comparator indicates that the identity number of that stage of the plurality of driving circuits is equal to the parameter value or an integer multiple of the parameter value, the selector is configured to set the inverted clock signal as the clock signal of a next stage of the plurality of driving circuits; when the comparison result obtained by the comparator indicates that the identity number corresponding to that stage of the plurality of driving circuits is equal to neither the parameter value nor an integer multiple of the parameter value, the selector is configured to set the clock signal of that stage of the plurality of driving circuits as the clock signal of the next stage of the plurality of driving circuits.

In some embodiments, the communication unit comprises a decoder.

In some embodiments, the inverter is a NOT gate.

In some embodiments, each of the plurality of driving circuits further comprises a driving unit, coupled to the communication unit to receive the corresponding display data which is decoded.

According to a second aspect of the present disclosure, the present disclosure provides a control method of a display system, wherein the control method comprises: providing a plurality of clock signals and a plurality of data signals; by each driving circuit group which comprises a plurality of driving circuits, receiving a corresponding one of the clock signals and a corresponding one of the plurality of data signals, and transmitting the corresponding one of the clock signals and the corresponding one of the data signals in the plurality of driving circuits, wherein the plurality of the driving circuits comprised by each driving circuit group are connected in cascade, and each stage of at least one of the plurality of driving circuits in each driving circuit group is configured to perform inverting processing on the clock signal received by that stage of the plurality of driving circuits to obtain an inverted clock signal.

In some embodiments, the control method further comprises: by each stage of the plurality of driving circuits, decoding the corresponding one of the data signals according to the clock signal received by that stage of the plurality of driving circuits, and transmitting the corresponding one of the data signals to a next stage of the plurality of driving circuits.

In some embodiments, each stage of the plurality of driving circuits in each driving circuit group is configured to perform inverting processing on the clock signal received by that stage of the plurality of driving circuits to obtain the inverted clock signal.

In some embodiments, the data signal corresponding to each driving circuit group comprises: display data, a parameter and identity numbers of the plurality of driving circuits comprised by that driving circuit group.

In some embodiments, the control method further comprises: by each stage of the plurality of driving circuits, selectively providing the inverted clock signal or the clock signal received by that stage of the plurality of driving circuits to a next stage of the plurality of driving circuits according to the parameter and a corresponding one of the identity numbers of the plurality of driving circuits, wherein the parameter value is a positive integer.

In some embodiments, in each stage of the plurality of driving circuits, the identity numbers of the plurality of driving circuits are sequentially configured to be 1, 2, 3, . . . , X or sequentially and cyclically configured to be 1 to N, where X is a positive integer and N represents the parameter value.

In some embodiments, in each stage of the plurality of driving circuits, when the identity number of that stage of the plurality of driving circuits is equal to the parameter value or an integer multiple of the parameter value, the inverted clock signal is set as the clock signal of a next stage of the plurality of driving circuits; when the identity number of that stage of the plurality of driving circuits is equal to neither the parameter value nor an integer multiple of the parameter value, the clock signal of that stage of the plurality of driving circuits is set as the clock signal of the next stage of the plurality of driving circuits.

In the LED display system provided by the present disclosure, an inverter is arranged in at least one stage of the plurality of driving circuits which are connected in cascade in each driving circuit group, and is configured to perform inverting processing on the clock signal and provide the inverted clock signal to a next stage of the plurality of driving circuits. Through simple hardware design, embodiments according to the present disclosure can effectively prevent the clock signal from suffering excessive attenuation in the cascaded driving circuits, ensure correctness of data sampling based on the clock signal, and ensure display effect of the LED display screen.

In some embodiments, an inverter is provided in every stage of the plurality of driving circuits, and is configured to invert the clock signal of that stage of the plurality of driving circuits to obtain the inverted clock signal and provide the inverted clock signal to the next stage of the plurality of driving circuits. Thus, not only the clock signal can be effectively prevented from suffering excessive attenuation in the cascaded driving circuits, but also the designability of the driving circuits and the flexibility of the LED display system can be improved. Further, in each stage of the plurality of driving circuits, a comparison and selection unit is also provided. The comparison and selection unit of each stage of the plurality of driving circuits is configured to provide the clock signal of that stage of the plurality of driving circuits or the inverted clock signal, which is obtained through inverting processing performed by the inverter, to a next stage of the plurality of driving circuits based on the identity number of that stage of the plurality of driving circuits and the parameter value provided by the control card, so that, in the LED display system, after being transmitted through each predetermined number, which is equal to the parameter value, of stages of the plurality of driving circuits, the clock signal is inverted into the inverted clock signal which is provided to a next stage of the plurality of driving circuits, and the clock signal of a previous stage of the plurality of driving circuits is supplied to other stages of the plurality of driving circuits. The parameter value described above can be flexibly adjusted according to a clock signal attenuation rate of a practical circuit, so as to be suitable for various application environments.

BRIEF DESCRIPTION OF THE DRAWINGS

The above and other objects, features and advantages of the present invention will become more apparent from the following description of embodiments of the present disclosure, with reference to the accompanying drawings, in which.

DETAILED DESCRIPTION OF EMBODIMENTS OF THE DISCLOSURE

Figure 1:
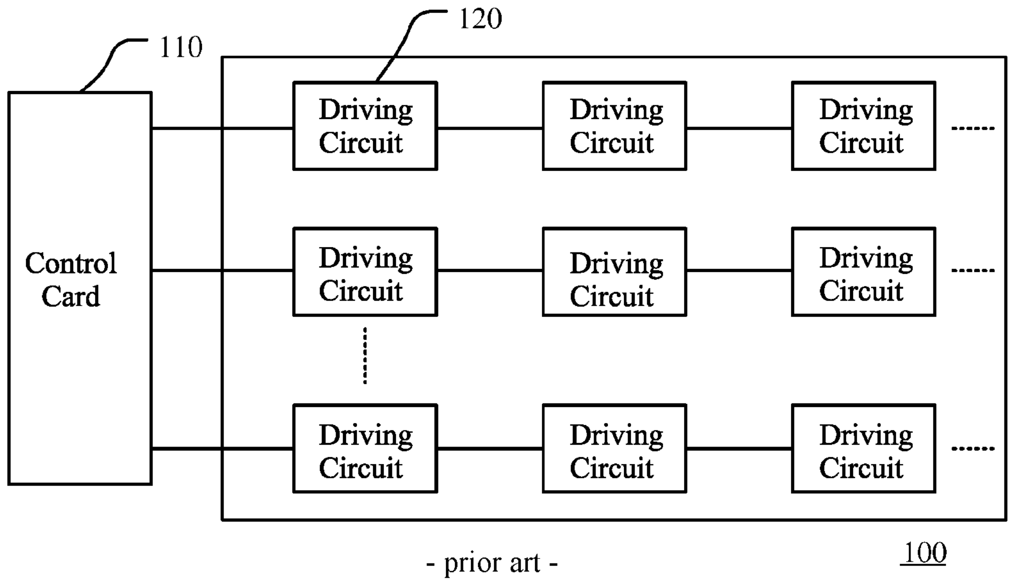
FIG. 1 shows a structural block diagram of a LED display system according to the prior art.

Various embodiments of the present invention will be described in more detail below with reference to the accompanying drawings. Throughout the various figures, like elements are denoted by same or similar reference numerals. For the sake of clarity, various parts in the drawings are not drawn to scale.

Specific embodiments of the present disclosure are described in further detail below with reference to the accompanying drawings and embodiments.

Figure 2:
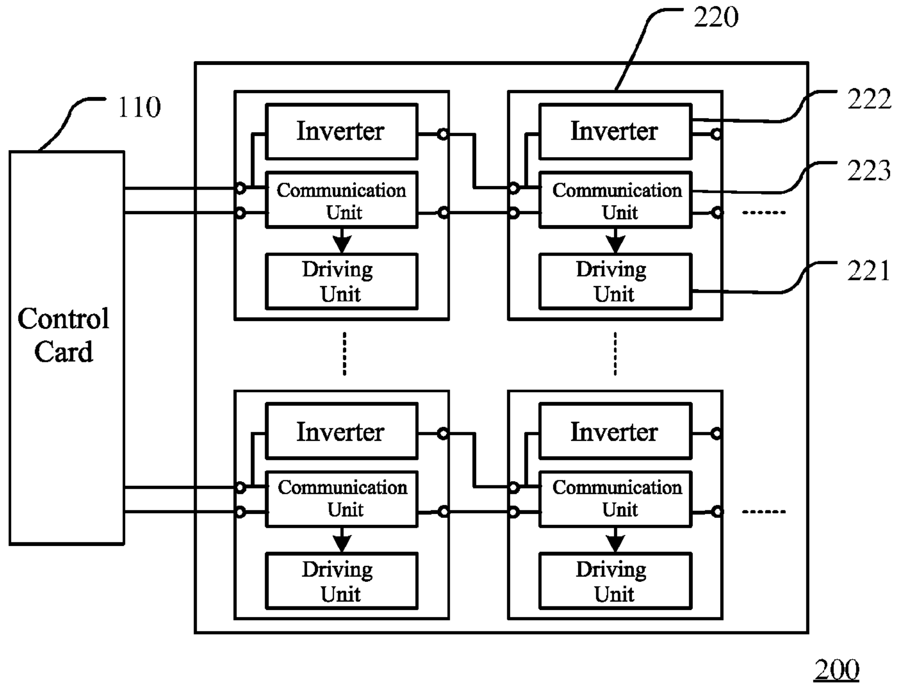
FIG. 2 shows a structural block diagram of a LED display system according to a first embodiment of the present disclosure.

FIG. 2 shows a structural block diagram of a LED display system according to a first embodiment of the present disclosure.

As shown in FIG. 2, the LED display system 200 comprises: a control card 110, a plurality of driving circuit groups which are respectively coupled to the control card 110. Each one of the plurality of driving circuit groups comprises a plurality of driving circuits 220 which are connected in cascade. The LED display system 200 also comprises a plurality of LED groups which are coupled to the driving circuits 220, wherein a LED display screen is formed by the plurality of LED groups.

The control card 110 is configured to provide a plurality of control signals, each of which controls a corresponding one of the plurality of driving circuits 220 that are connected in cascade. Each of the plurality of control signals comprises a data signal for driving a corresponding one of the plurality of LED groups and a clock signal for indicating timing logic, wherein the data signal at least comprises display data.

At least one stage of the plurality of driving circuits 220 comprises a driving unit 221, an inverter 222 and a communication unit 223.

The communication unit 223 is coupled to the control card 110 or a previous stage of the plurality of driving circuits 220 to receive a corresponding clock signal and a corresponding data signal, and is configured to decode the corresponding data signal in cooperation with the corresponding clock signal, and then transmit the corresponding display data required by the current stage of the plurality of driving circuits 220 to the driving unit 221. The communication unit 223 of that stage of the plurality of driving circuits is further configured to transmit the corresponding data signal to the communication unit of a next stage of the plurality of driving circuits 220. The inverter 222 is coupled to the control card 110 or a previous stage of the plurality of driving circuits 220 to receive the corresponding clock signal, and is configured to perform inverting processing on the received clock signal to obtain an inverted clock signal, which is to be provided to the next stage of the plurality of driving circuits 220.

Wherein, at least one stage of the plurality of driving circuits 220 comprised by the LED display system 200 is each provided with an inverter 222, and can be positioned as any stage of the plurality of driving circuits in the LED display system 200. Further, in the LED display system 200, one or more other driving circuit, each of which is not capable of performing inverting processing, each comprises only the communication unit 223 and the driving unit 221, wherein the communication unit 223 is coupled to the control card 110 or a previous stage of the plurality of driving circuits to receive a corresponding clock signal and a corresponding data signal, and is configured to transmit the corresponding clock signal and the corresponding data signal to a next stage of the plurality of driving circuits, decode the corresponding data signal in cooperation with the corresponding clock signal, and then transmit the display data required by the current stage of the plurality of driving circuits to the driving unit 221.

In some embodiments, as shown in FIG. 2, each stage of the plurality of driving circuits in the LED display system 200 is configured to be capable of performing inverting processing.

The LED display system 200 can effectively avoid continuous attenuation of a clock signal which is transmitted among a plurality of cascaded driving circuits, for example, after the clock signal with a duty cycle of 50% passes through one or more stage of driving circuit, the duty cycle may be attenuated to 40%, at this time, an inverting processing is performed on the clock signal with the duty cycle of 40%, so that high and low voltage levels are reversed, and the duty cycle of the clock signal may become 60%, avoiding excessive attenuation of the duty cycle, ensuring that data sampling based on the clock signal can be accurately realized and the LED display system can correctly read the data signal, thus the attenuation problem can be solved and the display effect of the LED display screen can be ensured. According to the embodiment, efficient attenuation processing can be achieved by use of the driving circuits with a small amount of hardware, thus saving cost.

Figure 3:
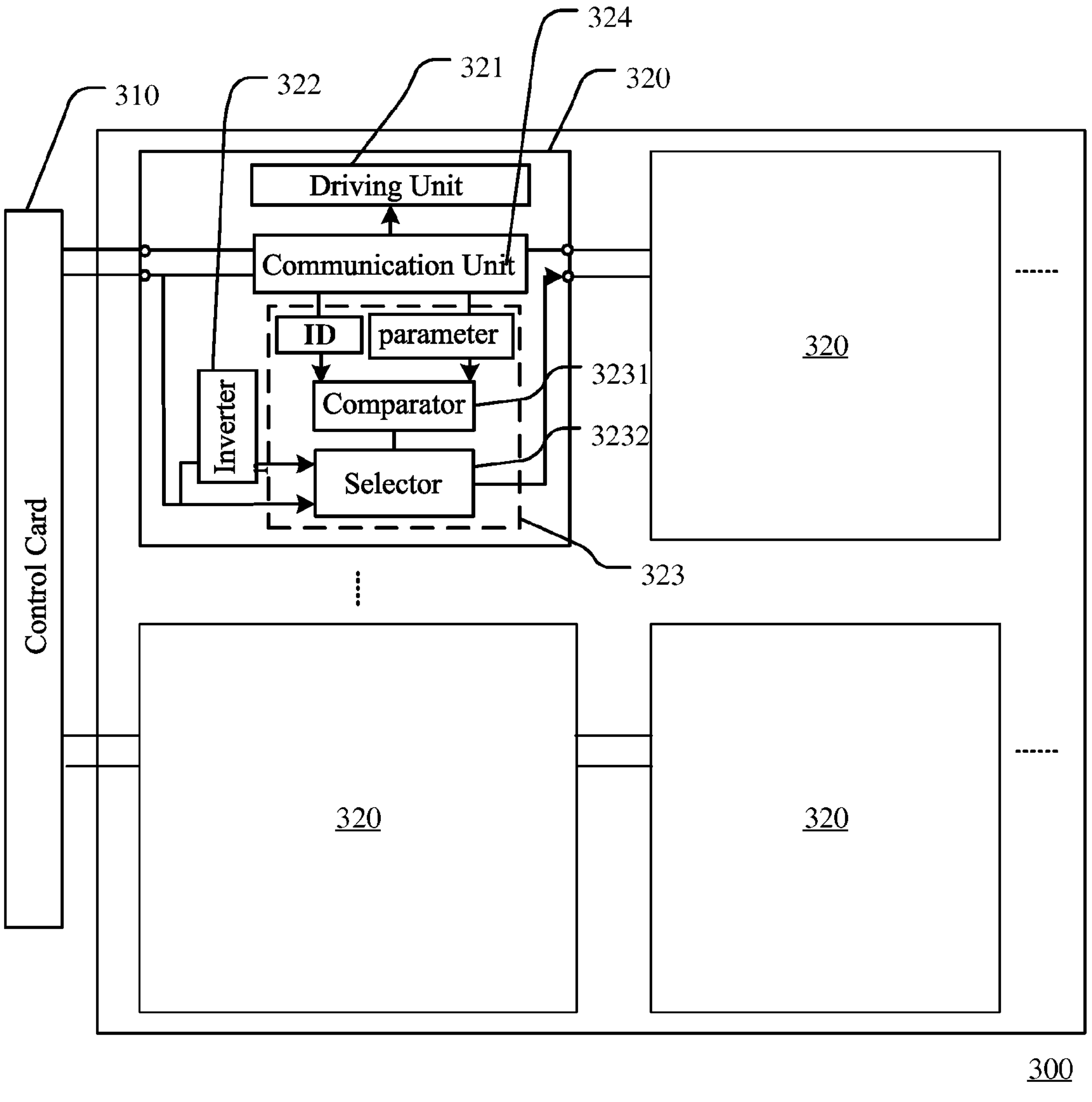
FIG. 3 shows a schematic structural diagram of a LED display system according to a second embodiment of the present disclosure.

FIG. 3 shows a schematic structural diagram of a LED display system according to a second embodiment of the present disclosure.

As shown in FIG. 3, the LED display system 300 comprises a control card 310, a plurality of driving circuit groups respectively coupled to the control card 310, and each one of the plurality of driving circuit groups comprises a plurality of driving circuits 320 which are connected in cascade. The LED display system 300 also comprises a plurality of LED groups coupled to the plurality of driving circuits 320, wherein a LED display screen is formed by the plurality of LED groups. Compared with the embodiment providing the LED display system 200 with at least one stage of the plurality of driving circuits, which is configured to perform inverting processing on the received clock signal and output the inverted clock signal to a next stage of the plurality of driving circuits, in the LED display system 300 according to this embodiment, each stage of the plurality of driving circuits 320 in each of the plurality of driving circuit groups is capable of performing inverting processing on the corresponding clock signal received by that stage of the plurality of driving circuits and selecting the received clock signal or the inverted clock signal as the clock signal, which is to be received by a next stage of the plurality of driving circuits 320, specifically, after a clock signal is transmitted through a number, which is equal to a predetermined parameter value, of driving circuits 320, an inverted clock signal is used as a clock signal to be received by a next stage of the plurality of driving circuits 320.

The control card 310 is configured to provide a plurality of control signals each controlling the plurality of cascaded driving circuits 320 in each driving circuit group. Each of the plurality of control signals comprises a data signal for driving a corresponding one of the plurality of LED groups and a clock signal for indicating timing logic. The control card 310 sets the parameter value N and configures an identity (ID) number document for each stage of the plurality of driving circuits 320. When it is determined by the parameter value N that the ID number of one of the plurality of driving circuits is equal to N or a multiple of N, an inverted clock signal is output as a clock signal to be received by a next stage of the plurality of driving circuits, wherein the parameter value N is a positive integer. Further, the ID number of each of the plurality of driving circuits 320 is used to indicate a relative position of that driving circuit 320 in the LED display system. For example, if one of the plurality of driving circuits 320 is positioned at the third stage of a driving circuit group receiving a corresponding one of the control signals outputted from the control card 310, an ID number equal to 3 is assigned to that stage of driving circuit 320 by the control card 310.

Each of the plurality of driving circuits 320 comprises: a driving unit 321, an inverter 322, a communication unit 324 and a comparison and selection unit 323. The comparison and selection unit 323 comprises a comparator 3231 and a selector 3232.

The inverter 322 is coupled to the control card 310 or a previous stage of the plurality of driving circuits 320 to receive a corresponding clock signal and is configured to perform inverting processing on the received clock signal to obtain an inverted clock signal.

The communication unit 324 is coupled to the control card 310 or the previous stage of the plurality of driving circuits 320 to receive the corresponding clock signal and the corresponding data signal, which at least comprises display data, identity numbers of the plurality of driving circuits 320 and the parameter value N, and the communication unit 324 is configured to decode the corresponding data signal in cooperation with the corresponding clock signal and send the display data required by the current stage of the plurality of driving circuit 320 to the driving unit 321. The communication unit 324 is further configured to transmit a control signal including the corresponding data signal to the communication unit of a next stage of the plurality of driving circuits 320. The communication unit 324 supplies the parameter value N obtained by decoding the corresponding data signal and the ID number assigned to the current stage of the plurality of driving circuits 320 to the comparison and selection unit 323 of the current stage of the plurality of driving circuits 320.

The comparator 3231 of the comparison and selection unit 323 is coupled to the communication unit 324 to receive the ID number, which is obtained by decoding, of the current stage of the plurality of driving circuits 320 and the parameter value N set by the control card 310, and is configured to output a comparison result obtained by comparing the ID number of the current stage of the plurality of driving circuits 320 and the parameter value N.

A first input terminal of the selector 3232 of the comparison and selection unit 323 is coupled to the inverter 322, a second input terminal is configured to receive the corresponding clock signal, a control terminal of the selector 3232 is coupled to an output terminal of the comparator 3231 to receive the comparison result, and an output terminal of the selector 3232 is configured to provide the inverted clock signal which is obtained by performing inverting processing through the inverter 322 or the corresponding clock signal received by the current stage of the plurality of driving circuits 320 to a next stage of the plurality of driving circuits 320, as the clock signal to be received by the next stage of the plurality of driving circuits 320. When the comparison result indicates that the ID number of the current stage of the plurality of driving circuits 320 is equal to the parameter value N or a multiple of the parameter value N, the selector 3232 is configured to output the inverted clock signal; otherwise, the selector is configured to output the received clock signal to a next stage of the plurality of driving circuits.

According to the LED display system 300 of this embodiment, each stage of the plurality of driving circuits 320 is configured to perform inverting processing on the corresponding clock signal received by that stage of the plurality of driving circuits to obtain an inverted clock signal, and provide the received clock signal or the inverted clock signal to a next stage of the plurality of driving circuits 320 according to the comparison result obtained by comparing the ID number corresponding to that stage of the plurality of driving circuits with the parameter value N, wherein after being transmitted through each N stages of the plurality of driving circuits, the clock signal is inverted to an inverted clock signal which is to be provided to a next stage of the plurality of driving circuits. The parameter value N can be determined according to an attenuation rate of the clock signal of the practical circuit, and in some embodiments, the parameter value N can be determined by the control card 310 and may not be immutable and fixed, and the parameter value N can be flexibly adjusted and controlled to be suitable for various application environments.

Figure 4:
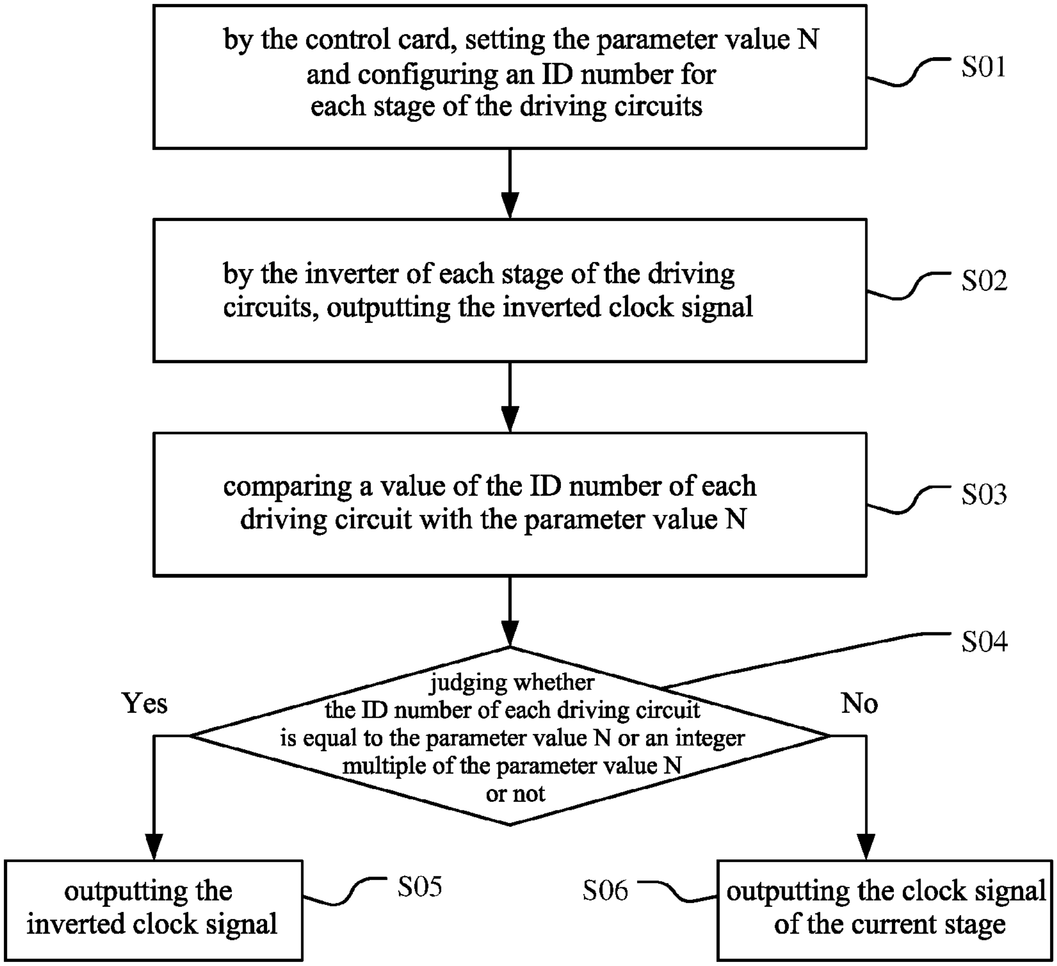
FIG. 4 is a schematic diagram showing an operating principle of a driving circuit in the LED display system according to the second embodiment of the present disclosure.

In particular, FIG. 4 shows a schematic diagram of an operating principle of a driving circuit in a LED display system according to the second embodiment of the present disclosure.

As shown in FIG. 4, following steps are provided, and it should be noted that the operating principle of the driving circuit is described in a form of flow chart, which only aims at providing a more detailed explanation of this embodiment.

S01: By the control card, the parameter value N is set and an ID number is configured for each stage of the plurality of driving circuits, where N is a positive integer.

There are two schemes for respectively configuring the ID numbers of the plurality of driving circuits. Scheme 1: if it is assumed that each signal from the control card 310 is supplied to a corresponding driving circuit group composed of X stages of driving circuits connected in cascade, the ID numbers, respectively corresponding to the X stages of the driving circuits 320 in the corresponding driving circuit group, are sequentially configured as 1, 2, 3 . . . X; Scheme 2: if it is assumed that each signal from the control card 310 is supplied to a corresponding driving circuit group consisting of X stages of driving circuits connected in cascade, the ID numbers, respectively corresponding to the X stages of the driving circuits 320 in the corresponding driving circuit group, are sequentially and cyclically configured to be 1 to N, where X is a positive integer.

S02: The inverter of each stage of the plurality of driving circuits is configured to output the inverted clock signal.

The inverter 322 of the current stage of the plurality of driving circuits 320 is configured to perform inverting processing on the received clock signal to obtain the inverted clock signal. A NOT gate realized by simple logic elements can be implemented as the inverter 322.

S03: A value of the ID number of each driving circuit is compared with the parameter value N. The comparator 3231 is configured to receive the ID number, which is decoded by the communication unit 324, and the parameter value N. By the communication unit 324, decoding can be implemented by, for example, setting up a decoder.

S04: Whether the ID number of each driving circuit is equal to the parameter value N or an integer multiple of the parameter value N or not is judged. The above scheme can be executed by a comparator 3231.

S05: If the ID number of one stage of the plurality of driving circuits is equal to the parameter value N or an integer multiple of the parameter value N, the inverted clock signal is supplied to a next stage of the plurality of driving circuits. If the comparison result obtained by the comparator 3231 indicates that the ID number of one stage of the plurality of driving circuits is equal to the parameter value N or an integer multiple of the parameter value N, the selector 3232 is configured to supply the inverted clock signal, which is obtained by the inverter 322 by performing inverting processing, to the next stage of the plurality of driving circuits 320.

S06: If the ID number of one stage of the plurality of driving circuits is equal to neither the parameter value N nor an integer multiple of the parameter value N, the clock signal received by the current stage of the plurality of driving circuits is supplied to a next stage of the plurality of driving circuits. If the comparison result obtained by the comparator 3231 indicates that the ID number of one stage of the plurality of driving circuits is equal to neither the parameter value N nor an integer multiple of the parameter value N, the selector 3232 is configured to directly supply the clock signal received by the current stage of the plurality of driving circuits 320 to the next stage of the plurality of driving circuits 320.

According to the first ID configuration scheme, it is judged whether the ID number of each driving circuit is equal to an integer multiple of the parameter value N; and according to the second ID configuration scheme, it is judged whether the ID number of each driving circuit is equal to the parameter value N.

The LED display system according to embodiments of the present disclosure can effectively avoid continuous attenuation of a clock signal, for example, after the clock signal with a duty cycle of 50% passes through one or more stage of driving circuit, the duty cycle may be attenuated to 40%, at this time, an inverting processing is performed on the clock signal with the duty cycle of 40%, so that high and low voltage levels are reversed, and the duty cycle of the clock signal may become 60%, avoiding excessive attenuation of the duty cycle, ensuring effective operation of data sampling based on the clock signal, ensuring that each digital signal can be correctly read by the LED display system, thus the display effect of the LED display screen can be ensured and the attenuation problem can be solved.

In the LED display system according to embodiments of the present disclosure, each stage of the plurality of driving circuits is provided with a comparison and selection unit and an inverter. In a practical equipment, which may have many stages of driving circuits, the comparison and selection unit and the inverter may also be arranged at intervals in the cascaded driving circuits, so that hardware cost can be reduced. At the same time, the interval can be reasonably designed according to attenuation rate, for example, a comparison and selection unit and an inverter can be arranged in the stages of driving circuits at intervals of one stage or ten stages. The lower the attenuation rate is, the larger the interval may be. A design with small interval is suitable for both of the system with high attenuation rate and the system with low attenuation rate.

The present disclosure also provides a control method, which can be applied to the display system according to the descriptions above.

The embodiments in accordance with the present disclosure, as described above, are not described in detail, and are not intended to limit the present invention to be implemented only as the described particular embodiments. Obviously, many modifications and variations are possible in light of the above. These embodiments have been chosen and described in detail by the specification to explain the principles and embodiments of the present disclosure so that those skilled in the art can make good use of the present invention and the modified use based on the present invention. The invention is to be limited only by the scope of the appended claims and the appended claims and equivalents thereof.

What is claimed is:

1. A LED display system, comprising:

a control card, configured to output a plurality of clock signals and a plurality of data signals;

at least one driving circuit group, which is coupled with the control card, wherein each of the at least one driving circuit group comprises a plurality of driving circuits which are connected in cascade, and is configured to receive a corresponding one of the plurality of clock signals and a corresponding one of the plurality of data signals and transmit the corresponding one of the plurality of clock signals and the corresponding one of the plurality of data signals in the plurality of driving circuits, wherein in each of the at least one driving circuit group, at least one stage of the plurality of driving circuits each comprise an inverter which is configured to perform inverting processing on the corresponding one of the plurality of clock signals, which is received by that stage of the plurality of driving circuits, to obtain an inverted clock signal, wherein the at least one stage of the plurality of driving circuits is each configured to output the corresponding one of the plurality of clock signals or the inverted clock signal selectively to a next stage of the plurality of driving circuits, according to a comparison result, obtained according to a parameter value and a corresponding identity number which are decoded from the corresponding one of the plurality of data signals received by that stage of the plurality of driving circuits.

2. The LED display system according to claim 1, wherein each stage of the driving circuits further comprises:

a communication unit, which is coupled with the control card or a previous stage of the plurality of driving circuits to receive the corresponding one of the plurality of clock signals and the corresponding one of the plurality of data signals, and is configured to decode the corresponding one of the plurality of data signals according to the corresponding one of the plurality of clock signals, and transmit the corresponding one of the plurality of data signals to a next stage of the plurality of driving circuits.

3. The LED display system according to claim 2, wherein each of the plurality of the driving circuits comprised by each of the at least one driving circuit group each comprises the inverter.

4. The LED display system according to claim 2, wherein the data signal corresponding to each of the at least one driving circuit group comprises: display data, the parameter value set by the control card and the identity numbers of the plurality of driving circuits comprised by that driving circuit group.

5. The LED display system according to claim 4, wherein each stage of the plurality of driving circuits further comprises:

a comparison and selection unit, coupled with the communication unit to receive the corresponding one of the plurality of data signals which is decoded, and configured to selectively provide the inverted clock signal or the corresponding one of the plurality of clock signals, which is received by that stage of the plurality of driving circuits, to a next stage of the plurality of driving circuits, according to the parameter value and a corresponding one of the identity numbers of the plurality of driving circuits, where the parameter value is a positive integer.

6. The LED display system according to claim 5, wherein in each stage of the plurality of driving circuits, the comparison and selection unit comprises:

a comparator, which is coupled to the communication unit to receive the parameter value and the identity number corresponding to that stage of the plurality of driving circuits, and configured to provide the comparison result obtained by comparing the parameter value and the identify number corresponding to that stage of the plurality of driving circuits;

a selector, having a first input terminal coupled with the inverter to receive the inverted clock signal, a second input terminal receiving the clock signal of that stage of the plurality of driving circuits, a control terminal coupled with an output terminal of the comparator to receive the comparison result, and an output terminal for outputting the inverted clock signal or the clock signal of that stage of the plurality of driving circuits to a next stage of the plurality of driving circuits.

7. The LED display system according to claim 4, wherein the identity numbers, respectively corresponding to the plurality of driving circuits in each of the at least one driving circuit group, are sequentially configured to be 1, 2, 3, . . . , X or sequentially and cyclically configured to be 1 to N, where X is a positive integer and N represents the parameter value.

8. The LED display system according to claim 6, wherein, in each stage of the plurality of driving circuits, when the comparison result obtained by the comparator indicates that the identity number corresponding to that stage of the plurality of driving circuits is equal to the parameter value or an integer multiple of the parameter value, the selector is configured to set the corresponding inverted clock signal as the clock signal of a next stage of the plurality of driving circuits; when the comparison result obtained by the comparator indicates that the identity number corresponding to that stage of the plurality of driving circuits is equal to neither the parameter value nor an integer multiple of the parameter value, the selector is configured to set the clock signal corresponding to that stage of the plurality of driving circuits as the clock signal of the next stage of the plurality of driving circuits.

9. The LED display system according to claim 2, wherein the communication unit comprises a decoder.

10. The LED display system according to claim 1, wherein the inverter is a NOT gate.

11. The LED display system according to claim 2, wherein each of the plurality of driving circuits further comprises a driving unit, coupled to the communication unit to receive the decoded display data.

12. A control method of a display system, comprising:

providing a plurality of clock signals and a plurality of data signals;

by each driving circuit group which comprises a plurality of driving circuits, receiving a corresponding one of the clock signals and a corresponding one of the plurality of data signals, and transmitting the corresponding one of the clock signals and the corresponding one of the data signals in the plurality of driving circuits, wherein in each driving circuit group, at least one stage of the plurality of driving circuits is configured to perform inverting processing on the corresponding one of the plurality of clock signals, which is received by that stage of the plurality of driving circuits, to obtain an inverted clock signal, wherein, the plurality of driving circuits comprised by each driving circuit group are connected in cascade, wherein the at least one stage of the plurality of driving circuits is each configured to output the corresponding one of the plurality of clock signals or the inverted clock signal selectively to a next stage of the plurality of driving circuits, according to a comparison result, obtained according to a parameter value and a corresponding identity number which are decoded from the corresponding one of the plurality of data signals received by that stage of the plurality of driving circuits.

13. The control method according to claim 12, further comprising:

by each stage of the plurality of driving circuits, decoding the corresponding one of the plurality of data signals according to the corresponding one of the plurality of clock signals which is received by that stage of the plurality of driving circuits and transmitting the corresponding one of the plurality data signals to a next stage of the plurality of driving circuits.

14. The control method according to claim 13, wherein in each driving circuit group, the plurality of driving circuits are respectively configured to perform inverting processing on the plurality of clock signals, which are received by the plurality of driving circuits, respectively, to obtain corresponding inverted clock signals.

15. The control method according to claim 13, wherein the data signal corresponding to each driving circuit group comprises: display data, the parameter value and the identity numbers of the plurality of driving circuits comprised by that driving circuit group.

16. The control method according to claim 15, further comprising:

selectively providing, by each stage of the plurality of driving circuits, the corresponding inverted clock signal or the corresponding one of the plurality of clock signals received by that stage of the plurality of driving circuits to a next stage of the plurality of driving circuits, according to the parameter value and a corresponding one of the identity numbers of the plurality of driving circuits, where the parameter value is a positive integer.

17. The control method according to claim 15, wherein the identity numbers, respectively corresponding to the plurality of driving circuits in each driving circuit group, are sequentially configured to be 1, 2, 3, . . . , X or sequentially and cyclically configured to be 1 to N, where X is a positive integer and N represents the parameter value.

18. The control method according to claim 16, wherein, in each stage of the plurality of driving circuits, when the identity number corresponding to that stage of the plurality of driving circuits is equal to the parameter value or an integer multiple of the parameter value, the corresponding inverted clock signal is provided as the clock signal of a next stage of the plurality of driving circuits; when the identity number corresponding to that stage of the plurality of driving circuits is equal to neither the parameter value nor an integer multiple of the parameter value, the clock signal corresponding to that stage of the plurality of driving circuits is provided as the clock signal of the next stage of the plurality of driving circuits.

19. The LED display system according to claim 1, wherein the at least one stage of the plurality of driving circuits each further comprise a selector, having a first input terminal coupled with the inverter to receive the inverted clock signal, a second input terminal for receiving the corresponding one of the plurality of clock signals, a control terminal to receive the comparison result, and an output terminal for outputting the inverted clock signal or the corresponding one of the plurality of clock signals to the next stage of the plurality of driving circuits, wherein when the selector is controlled to output the inverted clock signal to the next stage of the plurality of driving circuits, an input terminal of the inverter is directly connected to a clock receiving terminal of that stage of the plurality of driving circuits for receiving the corresponding one of the plurality of clock signals, and an output terminal of the inverter is directly connected to a clock receiving terminal of the next stage of the plurality of driving circuits.

* * * * *